No. 675,502.  
D. L. THOMAS.  
CHAIN AND SPROCKET GUARD.  
(Application filed Jan. 16, 1901.)  
Patented June 4, 1901.

(No Model.)

Witnesses  
D. L. Thomas, Inventor  
by C. A. Snow & Co.  
Attorneys

UNITED STATES PATENT OFFICE.

DAVID L. THOMAS, OF WHEATLAND, WYOMING.

CHAIN AND SPROCKET GUARD.

SPECIFICATION forming part of Letters Patent No. 675,502, dated June 4, 1901.

Application filed January 16, 1901. Serial No. 43,526. (No model.)

*To all whom it may concern:*

Be it known that I, DAVID L. THOMAS, a citizen of the United States, residing at Wheatland, in the county of Laramie and State of Wyoming, have invented a new and useful Chain and Sprocket Guard, of which the following is a specification.

This invention relates to guards for bicycles; and it has specific reference to a guard for preventing the trousers of a rider from catching in between the chain and the sprocket or from catching between the crank and the face of the sprocket or between the spokes of a sprocket, one object of the invention being to provide a simple, cheap, and efficient device that may be readily applied and which will be held securely in place by the clamping action of the crank, further objects and advantages of the invention being evident from the following description.

Figure 1:
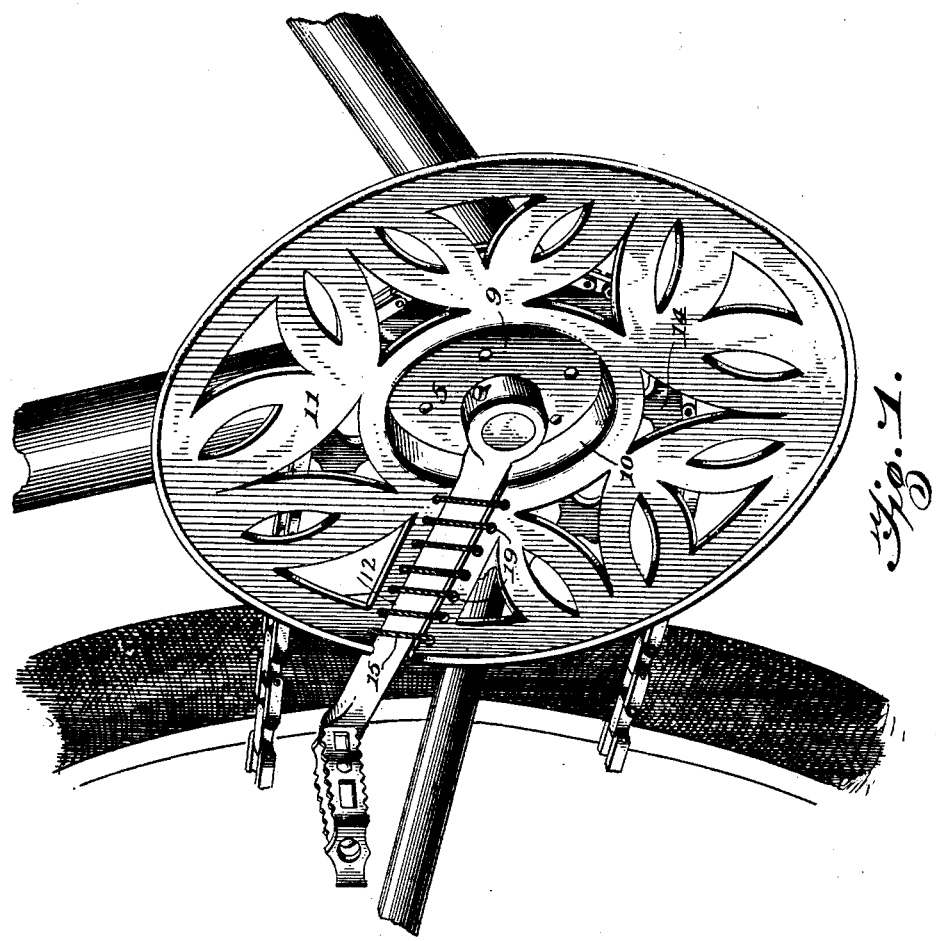
Figure 2:
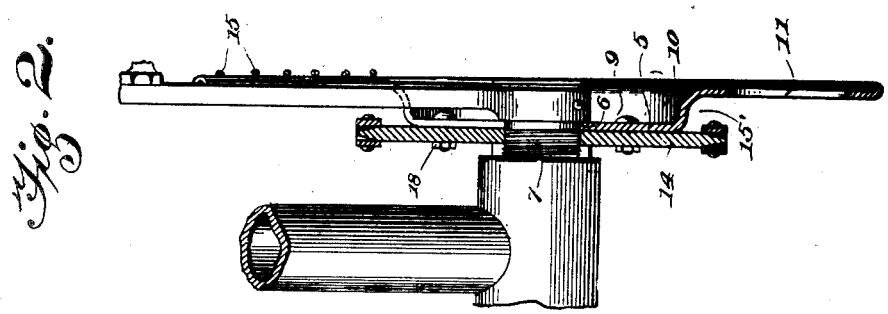

In the drawings forming a portion of this specification, and in which like numerals of reference indicate similar parts in both views, Figure 1 is a perspective view showing the device applied to the crank-sprocket of a bicycle. Fig. 2 is a diametrical sectional view of a crank-sprocket with the device applied thereto.

Referring to the drawings, the guard consists of an inner flat disk-shaped portion 9 and an outer flat peripheral portion 11, which is spaced laterally from the inner portion and lies in a plane parallel thereto, these inner and outer portions being connected by a web 10, lying at right angles thereto. In the inner portion 9 is formed a central opening 6 of such diameter as to permit it to receive the end of a crank-axle 7 when the guard is in its operative position. An opening 12 is formed in the web 10 to receive the crank of the bicycle to which the device is applied, and this opening is continued through the outer or peripheral portion 11 of the guard, in which the crank is adapted to lie.

In applying this guard to a crank-axle the crank adjacent to the sprocket-wheel 14 is removed and the plate is slipped over the axle, the web 10 projecting outwardly from the sprocket on a line less distant from the center of the sprocket than is the inner edge of the link of a chain engaged with the sprocket, while the portion 11 extends parallel with and slightly beyond the periphery of the sprocket. There is thus formed, in effect, an annular groove 15' between the outer sides of the teeth of the sprocket and the adjacent face of the portion 11, and in this groove lie the link sides of one side of all of the links at any time engaged with the sprocket. As the portion 11 of the guard projects slightly beyond the periphery of the sprocket-wheel, it projects also beyond those links that are engaged with the sprocket-wheel, and thus prevents engagement of the trousers of a rider with the sprocket-teeth or with the links of the chain. It further prevents contact of the trousers with the chain and consequent soiling of the trousers.

As an additional means for holding the guard in place, bolts 18 may be engaged through alining perforations in the guard and the sprocket, as shown in Fig. 1, it being noted that the flat central portion of the guard permits it to be clamped flat against the face of the sprocket, while the flanged or offset portion is held properly spaced from the outer side faces of the sprocket-teeth.

When the guard is in place, the crank is applied to lie snugly thereagainst and clamp it against the outer face of the sprocket, while the crank itself extends radially thereof and lies in the radial opening 12, thereby locking the guard to turn with the crank.

It will be noted that the opening 12 is cut entirely through the portion 11 and the web 10 to receive the crank, and in the plate at the edge of the opening there are formed perforations 19, which are adapted to receive a lacing 15, which will have the double function of strengthening the guard and of preventing the trousers of the rider from catching on the edges of the material of which the device is formed.

It will of course be understood that in practice various modifications of the specific construction shown may be made and that any suitable proportions and materials may be used without departing from the spirit of the invention.

It will be noted that the central portion of the guard is of such diameter as to permit of attachment of the guard to a sprocket of small diameter as well as to one of larger diameter, so that it may be used in connection with sprockets of various sizes.

What is claimed is—

1. A sprocket and chain guard consisting of a flat central portion and a flat laterally-offset peripheral portion, having a connecting web, the central portion having an opening to receive a crank-axle and the offset portion having an opening formed radially therethrough to receive a crank, said central and peripheral portions lying in parallel planes.

2. A sprocket and chain guard consisting of a flat central portion having an opening to receive a crank-axle, and a flat laterally-spaced peripheral portion having an opening formed radially therethrough to receive a crank, the central portion having additional openings therethrough to receive securing-bolts, said central and peripheral portions lying in parallel planes.

In testimony that I claim the foregoing as my own I have hereto affixed my signature in the presence of two witnesses.

DAVID L. THOMAS.

Witnesses:
O. SCOVELL,
G. S. AGNEW.